United States Patent Office 3,676,068
Patented July 11, 1972

3,676,068
METHOD FOR SYNTHESIZING DIAMOND
Alexandr Alexandrovich Shulzhenko and Anatoly Fedorovich Getman, Kiev, U.S.S.R., assignors to Ordena Trudovogo Krasnogo Znameni Ukrainsky Nauchno-Issledovatelsky Konstruktorsky, Teknnologichesky Institut Sinteticheskikh Sverkhtverdykh materialov i Instrumenta Gosplana Ukrainskoi SSR, Kiev, U.S.S.R.
No Drawing. Filed May 11, 1971, Ser. No. 142,800
Claims priority, application U.S.S.R., May 18, 1970, 1,436,483
Int. Cl. C01b *31/06*
U.S. Cl. 23—209.1                3 Claims

ABSTRACT OF THE DISCLOSURE

Diamond is synthesized by subjecting carbon-containing material in contact with a compound of mercury or lead, such as mercury oxide or lead oxide, to a temperature of at least 2000° C. and a pressure corresponding to a selected temperature within the diamond stability region.

---

The present invention relates to methods of producing superhard materials and, more particularly, the invention relates to methods of making diamonds synthetically.

Known in the art is a method of diamond synthesis, in which a carbon-containing material, in the presence of metals, is subjected to the action of a temperature of at least about 2000° C. and a pressure corresponding to a selected temperature within the diamond stability region for a period necessary for crystallization of diamond. For example, a method of diamond synthesis was proposed in 1939 by O. I. Leypunsky, according to which graphite is processed together with a medium (solvent e.g., iron) under a pressure of higher than 45 kbar. and at a temperature higher than 1500° K. (1227° C.). Later, a method of diamond synthesis was proposed, in which the medium includes metals or alloys selected from the following elements: Ni, Co, Fe, Mn, Gr, To, Ru, Rh, Pd, Os, Jr, Pt, while the process was effected under pressures exceeding 50 kbar. and at a temperature higher than 1200° C. (U.S. Pats. No. 2,947,609, No. 2,947,610, No. 2,947,611).

The basic disadvantage of the proposed methods are that the resultant diamonds contain a large amount of metallic inclusions. For example, with diamonds made from graphite in the presence of nickel, the quantity of impurities in the diamonds may be as high as 4%.

An object of the present invention is to eliminate the above-mentioned disadvantages.

Another object of the invention is to provide a method of synthesis of diamonds having a minimium content of impurities.

Still another object of the invention is to provide a method of synthesis of the most clear and transparent crystals of diamond.

These and other objects are attained by providing a method of synthesis of diamonds in which the carbon-containing material in the presence of metals is subjected to the action of a temperature of at least 2000° C. and a pressure corresponding to a selected temperature within the diamond stability region for a period sufficient for forming a diamond according to the invention, the method is characterized in that in conjunction with the carbon-containing material and in direct contact therewith when subjected to the above action are components taken separately or in combination and including mercury and/or lead which under this action evolve free mercury and/or lead. This provides for high purity of the resultant diamond.

For carrying the present invention into effect, the carbon-containing material may consist of graphite and other carbon-containing materials which, when subjected to high temperature and pressure, evolve free carbon capable of conversion into diamond.

The best results have been obtained when spectrally pure graphite has been used as a carbon-containing material.

Mercury and lead oxides have been used as a medium in which the graphite is transformed into diamond.

The reaction mixture may also be composed of a homogeneous mixture of powders of spectrally pure graphite and the said compounds (oxides) of mercury and lead. Furthermore, disks of graphite and disks of mercury oxide may be placed into a graphite heater in layers, one above the other. It is essential that the graphite or carbon-containing material is in direct contact with the said compounds. The ratios of the carbon-containing material and the mercury and lead compounds are not determinative for effecting the present invention.

The above-said reaction mixture is placed into a high-pressure high-temperature device of any type capable of providing pressures and temperatures necessary for synthesis of diamond. For example, for this purpose can be used a device having a cylindrical reaction space and having a base adjoining members of hard alloy or steel, while the lateral surface is made of a material having heat-and electro-insulating properties such as pyrophyllite.

The heating of the reaction mixture under pressure can be effected by any known method, for example, by using a known graphite heater through which an electric current is fed.

The pressure in the high-pressure device is determined by one of the known methods by measuring the changes in the electrical resistance under pressure of such metals as bismuth ($Bi_{II-III}$—27 kbar., $Bi_{III-V}$—89 kbar.), thallium ($Tl_{II-III}$—37 kbar.), barium ($Ba_{I-II}$—59 kbar.). The accuracy of measurement of the pressure in the high-pressure device at a temperature of 20° C. was ±6 kbar. The temperature in the high-pressure device was determined by the melting points of such metals as manganese, nickel, titanium, platinum. The accuracy of measurement of the temperature in the high-pressure device under a pressure of about 80 kbar. was ±100° C.

The present invention is carried into effect as follows.

EXAMPLE 1

A homogeneous mixture of spectrally-pure graphite and HgO in a volume ratio of 1:1 was placed into a heater made of spectrally pure graphite and was covered at both sides with graphite disks. Then the mixture was subjected to the action of a pressure of 95 kbar. and a temperature of 2200° C. and was held under these conditions during 3 minutes. 10 experiments were carried out under these conditions. In each case diamonds were produced.

EXAMPLE 2

A homogeneous mixture of naturally pure graphite and PbO in a volume ratio of 2:1 was placed into a heater of a spectrally pure graphite and was covered at both sides by graphite disks. Then the mixture was subjected to the action of a pressure of 96 kbar. and a temperature of 2300° C. and was held under these conditions during 2 minutes. 90 experiments were carried out. In each case diamonds were produced.

EXAMPLE 3

Disks of spectrally pure graphite and disks of $Pb_2O_3$ were placed in layers into a graphite heater and were subjected to the action of a pressure of 98 kbar. and a temperature of 2400° C. and were held under these conditions during 10 minutes. 9 experiments were conducted under these conditions. In each case diamonds were produced.

The diamonds synthesized by the proposed method are characterized by high purity and a low content of metallic impurities. It will be understood by those skilled in the art, that although in the above examples of carrying the invention into effect lead or mercury oxides are used for synthesis of diamonds, a similar process can be carried out by using other compounds capable of evolving free mercury or lead under the above-stated physical conditions (temperature, pressure).

We claim:

1. A method for synthesizing a diamond comprising the steps of preparing a mixture of a carbon-containing material taken in direct contact with a component selected from the group consisting of compounds of mercury lead and mixtures thereof, said components being capable of evolving free mercury and/or lead when said mixture is subject to a temperature of at least 2000° C. and a pressure corresponding to a selected temperature within the diamond stability region for a time sufficient for forming a diamond, and subjecting said mixture to a temperature of at least 2000° C. and a pressure corresponding to a selected temperature with the diamond stability region for a time sufficient for forming a diamond.

2. A method for synthesizing a diamond comprising the steps of preparing a mixture of pure graphite and mercury oxides in a volume ratio of from 1:1 to 2:1; and subjecting said mixture to a temperature of at least 2000° C. and a pressure corresponding to a selected temperature within the diamond stability region.

3. A method for synthesizing a diamond comprising the steps of preparing a mixture of pure graphite and lead oxides in a volume ratio of from 1:1 to 2:1; and subjecting said mixture to a temperature of at least about 2000° C. and a pressure corresponding to a selected temperature within the diamond stability region.

References Cited

UNITED STATES PATENTS

| | | | |
|---|---|---|---|
| 2,947,609 | 8/1960 | Strong | 23—209.1 |
| 2,992,900 | 7/1961 | Bovenkerk | 23—209.1 |
| 3,031,269 | 4/1962 | Bovenkerk | 23—209.1 |
| 3,124,422 | 3/1964 | Custers et al. | 23—209.1 |
| 3,325,254 | 6/1967 | Giardini et al. | 23—209.1 |

EDWARD J. MEROS, Primary Examiner